US008954552B2

(12) United States Patent
Chaganti

(10) Patent No.: US 8,954,552 B2
(45) Date of Patent: Feb. 10, 2015

(54) METHOD OF USING AN INFORMATION HANDLING SYSTEM TO RECEIVE AN UPDATE WHILE IN ABARE METAL STATE, AND AN INFORMATION HANDLING SYSTEM AND MACHINE-EXECUTABLE CODE FOR CARRYING OUT THE METHOD

(75) Inventor: Ravikanth Chaganti, Bangalore (IN)

(73) Assignee: Dell Products, LP, Round Rock, TX (US)

( * ) Notice: Subject to any disclaimer, the term of this patent is extended or adjusted under 35 U.S.C. 154(b) by 1027 days.

(21) Appl. No.: 12/264,989

(22) Filed: Nov. 5, 2008

(65) Prior Publication Data

US 2010/0070619 A1 Mar. 18, 2010

(30) Foreign Application Priority Data

Sep. 18, 2008 (IN) .............................. 2186/DEL/2008

(51) Int. Cl.
*G06F 15/16* (2006.01)
*G06F 9/445* (2006.01)
*H04L 12/24* (2006.01)
(52) U.S. Cl.
CPC .............. *G06F 8/67* (2013.01); *H04L 41/0803* (2013.01)
USPC ....................................................... 709/223
(58) Field of Classification Search
USPC ....................................................... 709/222
See application file for complete search history.

(56) References Cited

U.S. PATENT DOCUMENTS

| 7,203,560 | B1 * | 4/2007 | Wylie et al. ................... 700/110 |
| 7,293,168 | B2 * | 11/2007 | Maeda et al. ...................... 713/1 |
| 8,799,425 | B2 * | 8/2014 | Lonkar et al. .................. 709/221 |
| 2004/0230963 | A1 | 11/2004 | Rothman et al. |
| 2007/0169098 | A1 | 7/2007 | Kikuchi |
| 2007/0213092 | A1 * | 9/2007 | Geelen ...................... 455/556.1 |
| 2008/0027567 | A1 * | 1/2008 | Philyaw .......................... 700/40 |
| 2008/0098381 | A1 | 4/2008 | Lin |
| 2008/0155245 | A1 * | 6/2008 | Lipscombe et al. .............. 713/2 |
| 2008/0270685 | A1 | 10/2008 | Kato |
| 2009/0019137 | A1 * | 1/2009 | Mishra et al. ................. 709/220 |
| 2009/0216866 | A1 * | 8/2009 | Lu et al. ........................ 709/222 |
| 2010/0058042 | A1 * | 3/2010 | Locker et al. ..................... 713/2 |

* cited by examiner

Primary Examiner — Scott Christensen
(74) *Attorney, Agent, or Firm* — Larson Newman, LLP

(57) ABSTRACT

A method of using an information handling system can include sending configuration information over a network while the information handling system is running within a bare metal state. The method can also include receiving an update for a component while the information handling system is operating within the bare metal state, wherein the update corresponds to the configuration information and is received from a remote source via a network. The method can be performed automatically by an information handling system when executing machine readable code including instructions that allow a processor to carry out the method.

17 Claims, 3 Drawing Sheets

METHOD OF USING AN INFORMATION HANDLING SYSTEM TO RECEIVE AN UPDATE WHILE IN A BARE METAL STATE, AND AN INFORMATION HANDLING SYSTEM AND MACHINE-EXECUTABLE CODE FOR CARRYING OUT THE METHOD

CROSS REFERENCE TO RELATED APPLICATIONS

This application claims priority under 35 U.S.C. §119 to Indian Patent Application No. 2186/DEL/2008, entitled "METHOD OF USING AN INFORMATION HANDLING SYSTEM TO RECEIVE AN UPDATE WHILE IN A BARE METAL STATE, AND AN INFORMATION HANDLING SYSTEM AND MACHINE-EXECUTABLE CODE FOR CARRYING OUT THE METHOD," filed on Sep. 18, 2008.

FIELD OF THE DISCLOSURE

This disclosure relates generally to information handling systems, methods and code used by information handling systems, and more particularly to methods of using information handling systems to receive an update while in bare metal state and machine-executable code for carrying out the methods.

DESCRIPTION OF THE RELATED ART

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

An information handling system can have drivers or other software or firmware that can be updated using compact disks or other portable tangible medium, for example, a universal serial bus drive or other flash memory. After the compact disk or other memory is attached to the information handling system, the information handling system can be rebooted, and updated drivers can be updated before the operating system is loaded. A problem with this method of providing updates is that the updates may not be timely. By the time an update is received and installed, another update may already be available.

Another method for obtaining updates can use a browser-based or agent-based method. After an operating system is loaded, an update can be received by an information handling system by using a browser to manually select an update that is then downloaded and installed. Alternatively, a software agent can be used to automatically download and install an update. Both the browser-based and agent-based methods can be used only after the operating system is loaded.

BRIEF DESCRIPTION OF THE DRAWINGS

Skilled artisans appreciate that elements in the figures are illustrated for simplicity and clarity and have not necessarily been drawn to scale. For example, the dimensions of some of the elements in the figures may be exaggerated or minimized relative to other elements to help to improve understanding of embodiments of the invention. Embodiments incorporating teachings of the present disclosure are illustrated and described with respect to the drawings presented herein.

The use of the same reference symbols in different figures indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

The method and system as described herein can allow an information handling system (IHS) to receive updates for components within the IHS while the IHS is operating within its bare metal state. Thus, updates to components can be received in a timely manner and without having to wait months for a new revision on a compact disk. The updates can be provided using a network and received from a remote source without the IHS having to load an OS. Such a process is useful when the IHS does not have a locally stored copy of an OS. Other embodiments and benefits of the method and system will be apparent to skilled artisans after reading this specification.

As used herein, the term "bare metal state," with respect to an information handling system, is intended to mean that the information handling system is operating outside of both a pre-OS environment and an OS environment. In an embodiment, the information handling system may not have software locally available (e.g., on a disk drive) for a pre-OS (e.g., WinPE™, ELI™ or the like) or an OS (Windows Vista™, Mac OS X™, Solaris 10™, or the like). In a particular embodiment, the information handling system may not have any software but may have platform firmware, such as a basic input/output system (BIOS), network interface component (NIC) firmware, or the like.

Figure 1:
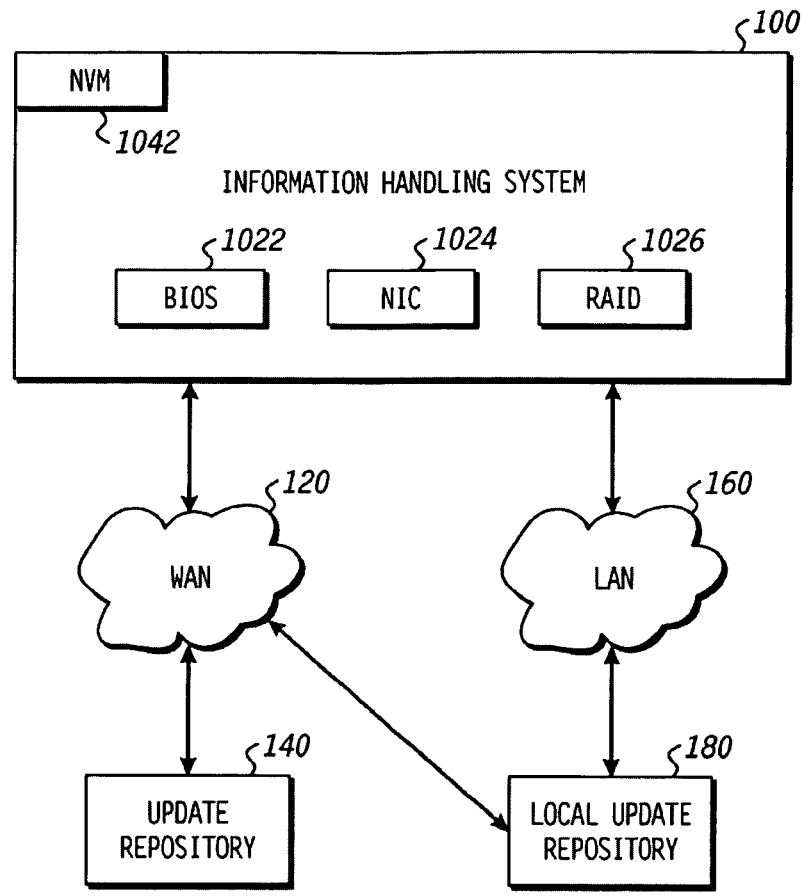
FIG. 1 includes a functional block diagram of an information handling system that can be used with one or more networks and one or more update repositories.

FIG. 1 includes a block diagram of an IHS 100 that includes a main board 1020, such as a motherboard, a base board, or the like. In the embodiment as illustrated in FIG. 1, the main board 1020 can include many components, such as a BIOS 1022, a NIC 1024, and a redundant array of independent disk (RAID) component 1026. The NIC 1024 is operable to allow the IHS 100 to communicate over a network, such as a wide area network (WAN) 120, a local area network (LAN) 160, another suitable network, or any combination thereof.

The IHS 100 further includes a non-volatile memory (NVM) 1042 that is operable to store information that can be accessed after the IHS 100 is powered down or rebooted. The NVM 1042 can be in the form of a secure digital (SD) memory, a USB drive, another type of flash memory, a hard disk drive, a solid-state drive, another suitable persistent memory, or any combination thereof. The NVM 1042 can reside within a housing of the IHS 100 or may be attached to and removed from the IHS 100 without removing any part of the housing.

Figure 2:
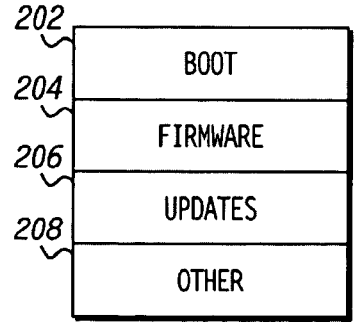
FIG. 2 includes a block diagram of a non-volatile memory that can be used with the information handling system of FIG. 1.

As illustrated in the embodiment of FIG. 2, the NVM 1024 can have different partitions, such as a boot partition 202, a firmware partition 204, an updates partition 206, another suitable partition 208, or any combination thereof. The boot partition 202 can include a unified extended firmware interface, a master boot record, or other information that can be used when the IHS is in the bare metal state. The firmware partition 204 can include updated images of platform and peripheral firmware, or any combination thereof. The updates partition 206 can include the updates for drivers and other code for components that are used when the IHS 100 is operating within its bare metal state. The other partition 208 can have other information that the user needs or desires to use during a booting sequence or thereafter As illustrated in the embodiment of FIG. 1, the IHS 100 is coupled to a WAN 120 and a LAN 160. In another embodiment (not illustrated), the IHS 100 can be coupled to another suitable network in place of or in addition to the WAN 120 and LAN 160. The WAN 120, LAN 160, other network, or any combination thereof may be a public or a private or secured network. In a particular non-limiting embodiment, the WAN 120 can be the Internet, and the LAN 160 can be a private or secured network. The IHS 120 can be coupled to the WAN 120, LAN 160, or other network using ethernet or other connections, or any combination thereof.

An update repository 140 can be coupled to the WAN 120, and a local update repository 180 can be coupled to the WAN 120 and the LAN 160. The repository 140, 160 or both can be located remotely from the IHS 100 and include updates for the IHS 100 and other IHSes (not illustrated) coupled to the WAN 120. The repository 140, 160, or both can include an update for the BIOS 1022, NIC 1024, RAID component 1026, another component within the IHS 100, or any combination thereof. The repository 140, 160, or both can include a server and a persistent memory where the updates are persisted. In a particular embodiment, the server can be a file server, a database server, or the like. The persistent memory can include one or more disk drives or other suitable persistent memory. When the server is a database server, the updates within the repository can be organized as a database. When the server is a file server, the file server can locate a file corresponding to the update and send it to the IHS 100. In some particular embodiments, the local update repository 180 is optional and may not be used.

Figure 3:
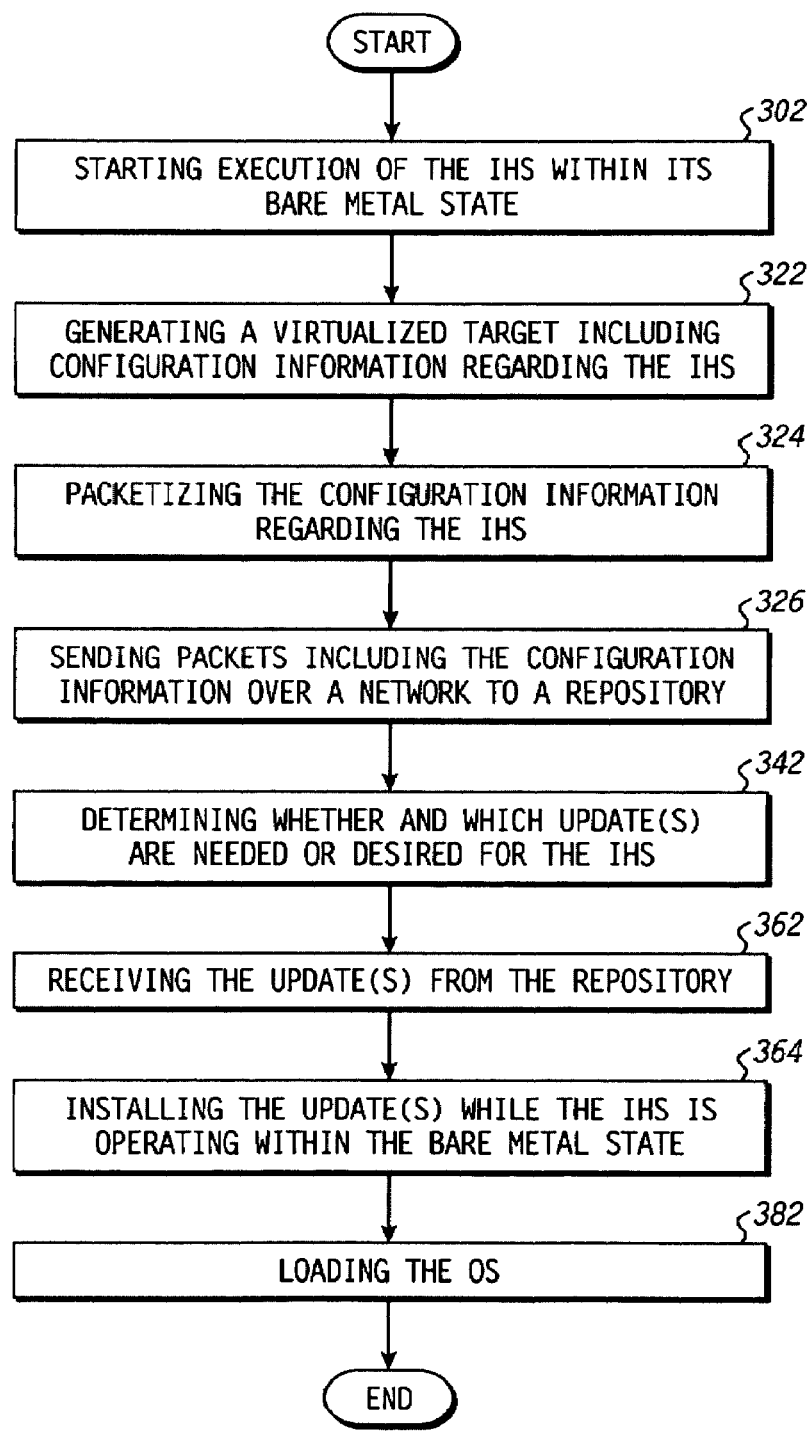
FIG. 3 includes a flow diagram of an exemplary method of updating a component of an information handling system while the information handling system is within its bare metal state.

The architecture as previously described can be used in operating an IHS that includes software, hardware, or firmware used within its bare metal state, wherein such software, hardware, or firmware has an update available. FIG. 3 includes a flow diagram of an exemplary method for updating a component while an IHS is operating within its bare metal state. References will be made to FIGS. 1 and 2 to aid in the understanding of the method and how the method relates to different parts of the architecture.

The method can include starting execution of the IHS within its bare metal state, at block 302 in FIG. 3. Code within the BIOS 1022 can be executed when the IHS 100 is powered up or rebooted and allow the IHS 100 to operate within its bare metal state. The method can also include generating a virtual target including configuration information regarding the IHS, at block 322. The configuration information can be information regarding a particular component, software or a currently used update for the component, a particular collection of components, software or updates for that collection of components, other suitable information reflecting a current state of the IHS 100, or any combination thereof. In a particular embodiment, the virtual target can be a virtual Internet Small Computer Serial Interface (iSCSI) target when the architecture uses ethernet connections and iSCSI protocol. A different virtual target may be used if a different protocol is used, as will be addressed in more detail below. The virtual target can be generated by the BIOS 1022 or a processor (not illustrated in FIG. 1) within the IHS 100. The configuration information can be based on the particular IHS (e.g., a serial number, a media access control address, or the like), a particular configuration (e.g., a particular component, a particular set of components, or the like), or another suitable criterion. In a particular embodiment, the virtual target can be assigned an Internet qualified name to allow communications using the virtual target.

The method can further include packetizing the configuration information regarding the IHS, at block 324 in FIG. 3. The packets can be in a Transmission Control Protocol (TCP), such as iSCSI protocol. Another protocol can be used, such as Fibre Channel Over Ethernet (FCOE) protocol, Serially Attached SCSI (SAS) protocol, or the like. If a non-TCP protocol is used, the packets can be wrapped within other packets that use TCP so that the packets can be transmitted over the network.

The method can include sending packets including the configuration information over the network to a repository, at block 326 in FIG. 3. The IHS 100 can send the configuration information to the update repository 140 via WAN 120 or to the local update repository 180 via LAN 160. A server or other IHS at the update repository 140 or local update repository 160 can receive the packets from the IHS 100. The server or other IHS at the repository 140 or 160 can parse the contents of the packets to obtain the configuration information.

The method can further include determining whether and which update(s) are needed or desired for the IHS, at block 342 in FIG. 3. In a particular embodiment, the configuration information received from the IHS 100 can be compared with information within the repository 140 or 160 to determine if any relevant updates are available. For example, a particular update may have a revision date later than a revision date of a component currently used by the IHS 100. If the revision date for the update to the component at the repository 140 or 160 is later than the revision date for the currently used version of the component at the IHS 100, the update can be determined as being needed or desired by the IHS 100.

In another embodiment, the IHS 100 may allow only certain components or certain types of updates to be updated while the IHS 100 is in its bare metal state. For example, the IHS 100 may allow updates for the BIOS 1022 and the NIC 1024, but not the RAID component 1026, to be updated while the IHS 100 is in its bare metal state. Such information may be transmitted with the packets, so that the server or other IHS at the repository 140 or 180 can determine that only updates to the BIOS 1022 and NIC 1024 are to be retrieved from a storage device at the repository. In another example, only particular types of updates may be retrieved. For example, updates that affect the basic operation or security of the IHS 100 may be updates that are to be obtained while the IHS 100 is operating within its bare metal state. Other updates that may affect the performance of such components in particular applications (e.g., an update to NIC 1024 to improve streaming video performance) may not be obtained while the IHS 100 is operation within its bare metal state. Any updates not obtained while the IHS 100 is operating within its bare metal state may be obtained after an OS is loaded. After reading this specification, skilled artisans will appreciate that a user of or administrator for the IHS 100 can select what components may be updated or what type of updates are to be installed while the IHS is operating within its bare metal state. After the server or IHS at the repository 140 or 180 has determined which update(s) are to be retrieved from storage, such update (s) can be sent to the IHS 100.

The method includes receiving the update(s) from the repository and installing the update(s) while the IHS is operating within its bare metal state, at blocks 362 and 364 in FIG. 3. The update(s) can initially be received by NIC 1024 and transmitted to BIOS 1022 or a processor (not illustrated) within the IHS 100. The BIOS 1022, processor, or both may be used to install the update. The IHS 100 may or may not be rebooted to complete the installation process. Alternatively, the component being updated may be restarted to allow the update to take effect. The update(s) can be installed before loading the OS is completed. The method can further include loading the OS, at block 382 in FIG. 3. If needed or desired, other updates can be received and installed after the OS is loaded. For example, agents installed on the IHS 100 can be used in an update sequence after the OS is loaded. Alternatively, a browser can be run to allow a user at IHS 100 to select updates after the OS is loaded.

The method as described herein is flexible. The local repository 180 can be used in conjunction with an entity that desires to make updates available independently of the repository 140, to obtain updates potentially quicker than obtaining the updates through the repository 140, or to make only certain updates available to IHSes coupled to the LAN 160. For example, an administrator responsible for LAN 160 may determine what updates are to be available to which IHSes under the administrator's authority. In this manner, updates for the IHS 100 can be obtained from repository 180. In a particular embodiment, the IHS 100 can only obtain the bare metal state updates from the repository 180 and not from repository 140. A server or other IHS at the repository 180 can obtain from the repository 140 updates for IHSes supported by LAN 160 as the updates become available, on a periodic basis, or as first requested by a particular IHS supported by the LAN 160. The server or other IHS at the repository can obtain updates from the repository 140 via WAN 120. The updates can be based on components or other information regarding the IHSes supported by the LAN 160.

The systems and methods described above are useful for and can be implemented using a wide variety of different IHSes. For purposes of this disclosure, an IHS can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS can be a personal computer, a PDA, a consumer electronic device, a network server or storage device, a switch router, wireless router, or other network communication device, or any other suitable device and can vary in size, shape, performance, functionality, and price. The IHS can include memory, one or more processing resources such as a central processing unit (CPU) or hardware or software control logic. Additional components of the IHS can include one or more storage devices, one or more communications ports for communicating with external devices, as well as various input and output (I/O) devices, such as a keyboard, a mouse, and a video display. The IHS can also include one or more buses operable to transmit communications between the various hardware components.

Although referred to as a "device," the device may be configured as hardware, firmware, software, or any combination thereof. For example, the device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be firmware (such as any software running on an embedded device, a Pentium class or PowerPC™ brand processor, or other such device) or software (such as any software capable of operating in the relevant environment). The device could also be a combination of any of the foregoing examples of hardware, firmware, or software.

Devices or programs that are in communication with one another need not be in continuous communication with each other unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. In this context, a communicative interaction may be intending to send information, sending information, requesting information, receiving information, receiving a request for information, or any combination thereof. As such, a communicative interaction could be unidirectional, bi-directional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. Whatever form the communicative interaction takes, the network elements involved need not take any specific form. A network element may be a node, a piece of hardware, software, firmware, middleware, some other component of a computing system, or any combination thereof.

Figure 4:
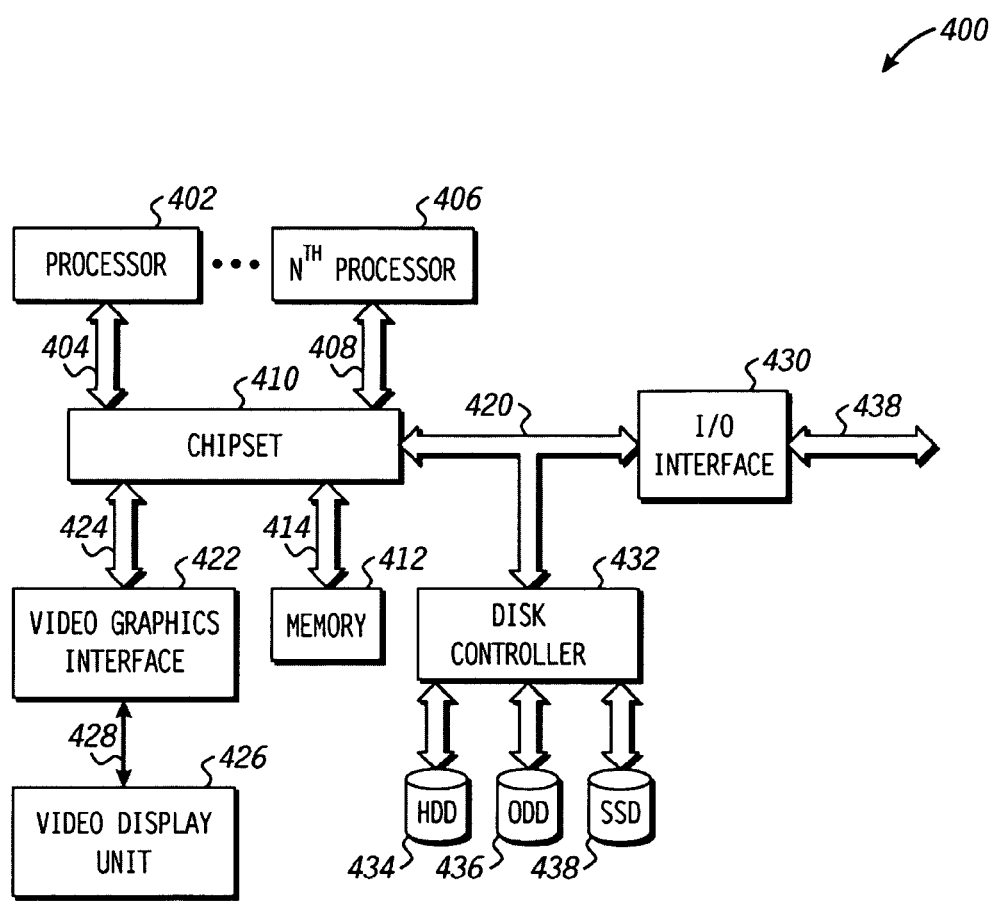
FIG. 4 includes a functional block diagram of an information handling system that can be used in different parts of the system as illustrated in FIG. 1.

FIG. 4 illustrates a block diagram of an exemplary embodiment of an IHS, generally designated as 400. In one form, the IHS 400 can be a computer system such as a server. As shown in FIG. 4, the IHS 400 can include a first physical processor 402 coupled to a first host bus 404 and can further include additional processors generally designated as $n^{th}$ physical processor 406 coupled to a second host bus 408. The first physical processor 402 can be coupled to a chipset 410 via the first host bus 404. Further, the $n^{th}$ physical processor 406 can be coupled to the chipset 410 via the second host bus 408. The chipset 410 can support multiple processors and can allow for simultaneous processing of multiple processors and support the exchange of information within IHS 400 during multiple processing operations.

According to one aspect, the chipset 410 can be referred to as a memory hub or a memory controller. For example, the chipset 410 can include an Accelerated Hub Architecture (AHA) that uses a dedicated bus to transfer data between first physical processor 402 and the $n^{th}$ physical processor 406. For example, the chipset 410 including an AHA enabled-chipset can include a memory controller hub and an I/O controller hub. As a memory controller hub, the chipset 410 can function to provide access to first physical processor 402 using first bus 404 and $n^{th}$ physical processor 406 using the second host bus 408. The chipset 410 can also provide a memory interface for accessing memory 412 using a memory bus 414. In a particular embodiment, the buses 404, 408, and 414 can be individual buses or part of the same bus. The chipset 410 can also provide bus control and can handle transfers between the buses 404, 408, and 414.

According to another aspect, the chipset 410 can be generally considered an application specific chipset that provides connectivity to various buses, and integrates other system functions. For example, the chipset 410 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 410. The chipset 410 can also be packaged as an ASIC.

The IHS 400 can also include a video graphics interface 422 that can be coupled to the chipset 410 using a third host bus 424. In one form, the video graphics interface 422 can be an Accelerated Graphics Port (AGP) interface to display content within a video display unit 426. Other graphics interfaces may also be used. The video graphics interface 422 can provide a video display output 428 to the video display unit 426. The video display unit 426 can include one or more types of video displays such as a flat panel display (FPD) or other type of display device.

The IHS 400 can also include an I/O interface 430 that can be connected via an I/O bus 420 to the chipset 410. The I/O interface 430 and I/O bus 420 can include industry standard buses or proprietary buses and respective interfaces or controllers. For example, the I/O bus 420 can also include a PCI bus or a high speed PCI-Express bus. In one embodiment, a PCI bus can be operated at approximately 66 Mhz and a PCI-Express bus can be operated at approximately 128 Mhz. PCI buses and PCI-Express buses can be provided to comply with industry standards for connecting and communicating between various PCI-enabled hardware devices. Other buses can also be provided in association with, or independent of, the I/O bus 420 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 410 can be a chipset employing a Northbridge/Southbridge chipset configuration (not illustrated). For example, a Northbridge portion of the chipset 410 can communicate with the first physical processor 402 and can control interaction with the memory 412, the I/O bus 420 that can be operable as a PCI bus, and activities for the video graphics interface 422. The Northbridge portion can also communicate with the first physical processor 402 using first bus 404 and the second bus 408 coupled to the $n^{th}$ physical processor 406. The chipset 410 can also include a Southbridge portion (not illustrated) of the chipset 410 and can handle input/output (I/O) functions of the chipset 410. The Southbridge portion can manage the basic forms of I/O such as Universal Serial Bus (USB), serial I/O, audio outputs, Integrated Drive Electronics (IDE), and ISA I/O for the IHS 400.

The IHS 400 can further include a disk controller 432 coupled to the I/O bus 420, and connecting one or more internal disk drives such as a hard disk drive (HDD) 434, an optical disk drive (ODD) 436, and a solid-state drive (SSD) 438.

The IHS 400 can further include a BIOS 452 that can be coupled to the chipset 410 using a system bus 454. In one form, BIOS 452 can include code to allow the IHS 400 to operate within its bare metal state until the operating system is loaded. The BIOS 452 can include code for a software or hardware initiator that can allow a network adapter to communicate with another system or device on a network while the IHS 400 is operating within its bare metal state.

The IHS 400 can also include the I/O interface 440. The I/O interface 440 includes a network adapter that is operably coupled to an external communication bus that is operable to be coupled to a network, such as a LAN, a WAN, a private network, a public network (e.g., the Internet), or any combination thereof.

With respect to other figures as described in this specification, the IHS 400 can be a particular embodiment of the IHS 100, an IHS at the repository 140 or 180, such as a database server, a storage area network server, another IHS coupled to the WAN 120 or LAN 160 or used to operate the network (e.g., switches, routers, management servers), or any combination thereof.

Embodiments as described herein can be used for obtaining an update to components of an IHS while the IHS is operating within its bare metal state. In a particular embodiment, the update can be for a component that typically operates within the bare metal state. Updates that affect the basic operation or security of the component or IHS can allow for better or more secure operation. The component affected or the IHS may be restarted or rebooted to complete the installation. The method is useful for an IHS that loads an OS from a remote source (also called "bare metal" systems). As compared to a CD-based update system, the update can be more delivered timely and allow for a subsequent revision to be received and used without having to wait for months for the next update to be received. The system and method can also be advantageous to smaller entities that may not have good access to information technology (IT) personnel (e.g., no IT employees or have limited access to IT contractors).

Many different aspects and embodiments are possible. Some of those aspects and embodiments are described below. After reading this specification, skilled artisans will appreciate that those aspects and embodiments are only illustrative and do not limit the scope of the present invention.

In a first aspect, a method of using an information handling system can include sending configuration information over a network while the information handling system is running within a bare metal state. The method can also include receiving a first update for a component while the information handling system is operating within the bare metal state, wherein the first update corresponds to the configuration information and is received from a remote source via a network.

In an embodiment of the first aspect, the method further includes loading an OS during or after receiving the first update, and installing the first update before loading the OS is completed. In another embodiment, the method further includes packetizing the identifying information into packets that can be used with a TCP. In still another embodiment, the update is for a BIOS, a network interface component, a redundant array of independent disks component, or any combination thereof. In a further embodiment, the method further includes generating a virtual target that is configured to expose the identifying information to the remote source.

In a second aspect, machine-executable code for an information handling system can be embedded within a tangible medium and include instructions for carrying out a method. The method can include sending configuration information over a network while the information handling system is running within a bare metal state. The method can also include receiving a first update for a component while the information handling system is operating within the bare metal state, wherein the first update corresponds to the configuration information and is received from a remote source via a network.

In an embodiment of the second aspect, the method further includes loading an operating system (OS) during or after receiving the first update. In another embodiment, the method further includes installing the first update before loading the OS is completed. In still another embodiment, the method further includes packetizing the identifying information. In a particular embodiment, sending the identifying information is performed using an iSCSI protocol. In yet another embodiment, the update is for a BIOS, a network interface component, a RAID component, or any combination thereof.

In a further embodiment of the second aspect, the remote source includes a server coupled to the information handling system via a wide area network. In still a further embodiment, the remote source includes a first server coupled to the information handling system via a network that includes a local area network, and a second server is coupled to the first server, wherein the first server is operable to receive a set of updates, including the first update, from the seconded server via the wide area network before the information handling system receives the first update. In yet a further embodiment, the method further includes generating a virtual target that is configured to expose the identifying information to the remote source. In a particular embodiment, the virtual target includes an Internet qualified name.

In a third aspect, an information handling system can include a BIOS operable to start the information handling system within the bare metal state, and a network interface component coupled to the BIOS. While the information handling system is operating within the bare metal state, the network interface component is operable to send identifying information over a network to a remote source, and receive a first update from the remote source via the network in response to sending the configuration information.

In an embodiment of the third aspect, the information handling system is operable to install the first update before loading an OS is completed. In another embodiment, the information handling system further includes a flash memory to store the first update. In still anther embodiment, the information handling system further includes a housing wherein the persistent memory is capable of being removed from the system without opening or removing a portion of the housing. In yet another embodiment, the information handling system is operable to generate a virtual target and to packetize the configuration information in a transmission control protocol before sending the configuration information over the network.

After reading this specification, the functionality or performance of the methods described herein can be implemented in hardware, firmware, software, other machine-readable code, or any combination thereof. Further, methods described herein can be performed automatically; however, a portion of the method can be performed manually if needed or desired.

Note that not all of the activities described above in the general description or the examples are required, that a portion of a specific activity may not be required, and that one or more further activities may be performed in addition to those described. Still further, the order in which activities are listed are not necessarily the order in which they are performed.

In the description herein, a flow charted technique is described in a series of sequential actions. The sequence of the actions and the party performing the steps may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described herein. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for updating an information handling system (IHS) while in a bare metal state, the method comprising:
    loading the IHS within the bare metal state, wherein while in the bare metal state, the information handling system operates outside of both a pre-OS environment and an OS environment;
    generating a virtual target including configuration information regarding the IHS, the configuration information reflecting a current state of the IHS, the virtual target being configured to expose the configuration information to a remote source,
        wherein the configuration information specifies that the IHS allows for at least a first type of updates, but does not allow for a second type of updates, for a first plurality of components in the information handling system while the IHS is running within the bare metal state based on the configuration information,
        wherein the first type of updates affect a basic operation or security of the IHS, and the second type of updates affect a performance of the first plurality of components in particular applications;
    sending the configuration information from the IHS over a network to an update repository; and
    receiving, from the update repository based on the sent configuration information, a first update for a component within the first plurality of components while the information handling system is operating within the bare metal state and based on a determination being made that the first update has a first revision date later than a second revision date of the component,
        wherein the first update corresponds to the configuration information and is received from the remote source via the network, and
    wherein the second type of updates are not received based on the configuration information.

2. The method of claim 1, further comprising:
    loading an operating system (OS) during or after receiving the first update; and
    installing the first update before loading the OS is completed.

3. The method of claim 1, further comprising packetizing the configuration information into packets that can be used with a transmission control protocol.

4. The method of claim 1, wherein the update is for a BIOS, a network interface component, a redundant array of independent disks component, or any combination thereof.

5. A non-transitory computer readable medium storing instructions for causing an information handling system (IHS) to execute a method, the method comprising:
    loading the IHS within the bare metal state, wherein while in the bare metal state, the information handling system operates outside of both a pre-OS environment and an OS environment;
    generating a virtual target including configuration information regarding the IHS, the configuration information reflecting a current state of the IHS, the virtual target being configured to expose the configuration information to a remote source,
        wherein the configuration information specifies that the IHS allows for at least a first type of updates, but does not allow for a second type of updates, for a first plurality of components in the IHS while the IHS is running within the bare metal state based on the configuration information,
        wherein the first type of updates affect a basic operation or security of the IHS, and the second type of updates affect a performance of the first plurality of components in particular applications;
    sending the configuration information from the IHS over a network to an update repository; and
    receiving, from the update repository based on the sent configuration information, a first update for a component within the first plurality of components while the information handling system is operating within the bare metal state and based on a determination being made that the first update has a first revision date later than a second revision date of the component,
        wherein the first update corresponds to the configuration information and is received from the remote source via the network, and
    wherein the second type of updates are not received based on the configuration information.

6. The non-transitory computer readable medium of claim 5, wherein the method further comprises loading an operating system.

7. The non-transitory computer readable medium of claim 6, wherein the method further comprises installing the first update before loading the operating system.

8. The non-transitory computer readable medium of claim 5, wherein the method further comprises packetizing the configuration information.

9. The non-transitory computer readable medium of claim 8, wherein sending the information is performed using an Internet Small Computer Serial Interface (iSCSI) protocol.

10. The non-transitory computer readable medium of claim 5, wherein the update is for a BIOS, a network interface component, a redundant array of independent disks component, or any combination thereof.

11. The non-transitory computer readable medium of claim 5, wherein the remote source comprises a server coupled to the information handling system via a wide area network.

12. The non-transitory computer readable medium of claim 5, wherein:
the remote source comprises a first server coupled to the information handling system via a network that includes a local area network; and
a second server is coupled to the first server, wherein the first server is operable to receive a set of updates, including the first update, from the second server via the wide area network before the information handling system receives the first update.

13. The machine-executable code of claim 5, wherein the virtual target comprises an Internet qualified name.

14. An information handling system (IHS) comprising:
a processor;
a basic input/output system (BIOS) configured to:
load the IHS within a bare metal state, wherein while in the bare metal state, the information handling system operates outside of both a pre-OS environment and an OS environment;
generate a virtual target including configuration information regarding the IHS, the configuration information reflecting a current state of the IHS, the virtual target being configured to expose the configuration information to a remote source,
wherein the configuration information specifies that the IHS allows for at least a first type of updates, but does not allow for a second type of updates, for a first plurality of components in the IHS while the IHS is running within the bare metal state based on the configuration information,
wherein the first type of updates affect a basic operation or security of the IHS, and the second type of updates affect a performance of the first plurality of components in particular applications;
a network interface component coupled to the BIOS and to the processor, the network interface component configured to:
send the configuration information from the IHS over a network to an update repository; and
receive, from the update repository based on the sent configuration information, a first update for a component within the first plurality of components while the information handling system is operating within the bare metal state and based on a determination being made that the first update has a first revision date later than a second revision date of the component,
wherein the first update corresponds to the configuration information and is received from the remote source via the network, and
wherein the second type of updates are not received based on the configuration information.

15. The information handling system of claim 14, further comprising a flash memory to store the first update.

16. The information handling system of claim 14, further comprising a housing wherein a persistent memory is capable of being removed from the system without opening or removing a portion of the housing.

17. The information handling system of claim 14, wherein the information handling system is operable to packetize the configuration information in a transmission control protocol before sending the configuration information over the network.

* * * * *